July 15, 1952     H. A. ANDERSON     2,603,302
ADJUSTABLE WIDTH TRACTOR
Filed Sept. 8, 1945     4 Sheets-Sheet 3
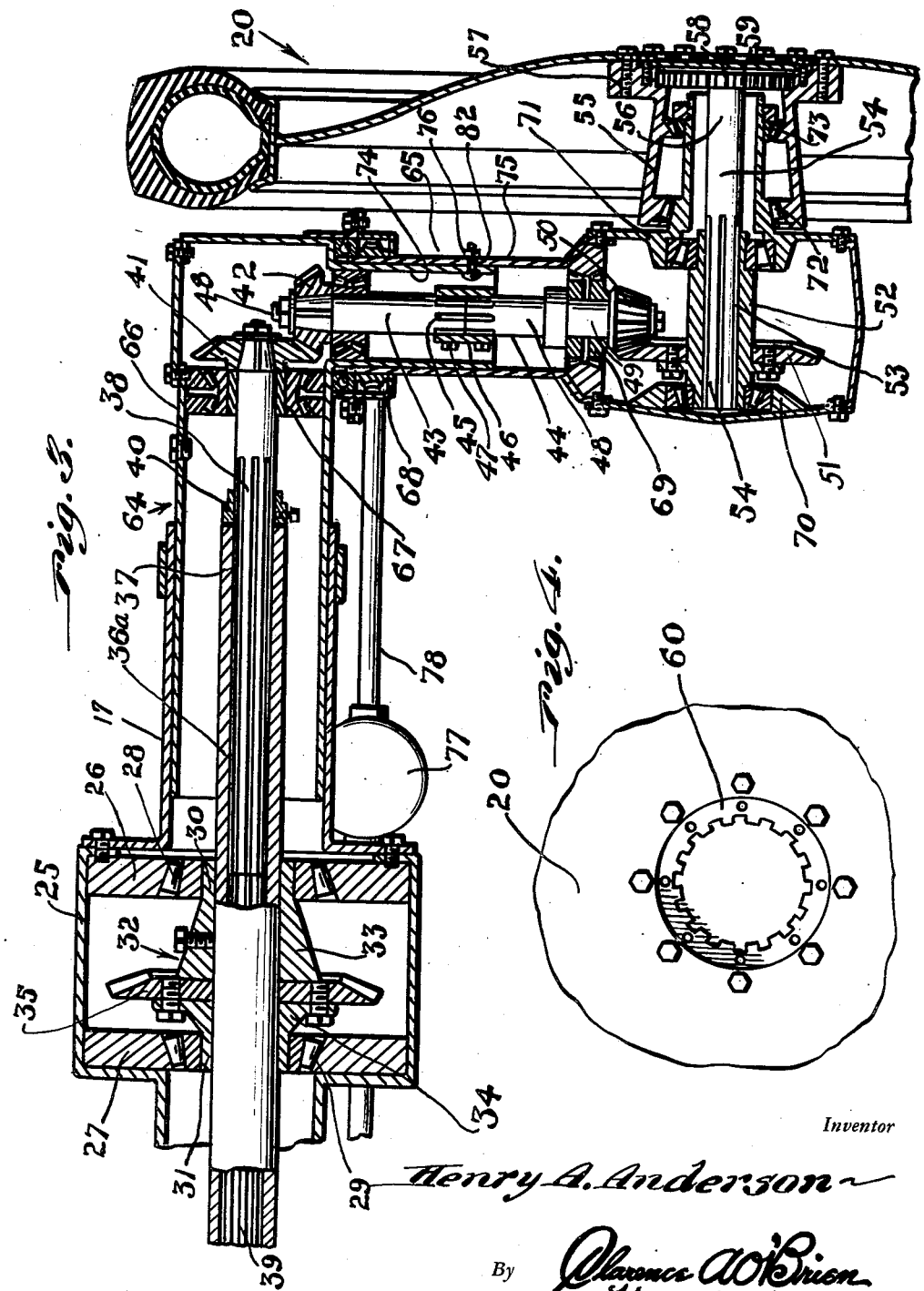
Inventor
Henry A. Anderson
By Clarence A. O'Brien
and Harvey B. Jacobson
Attorneys

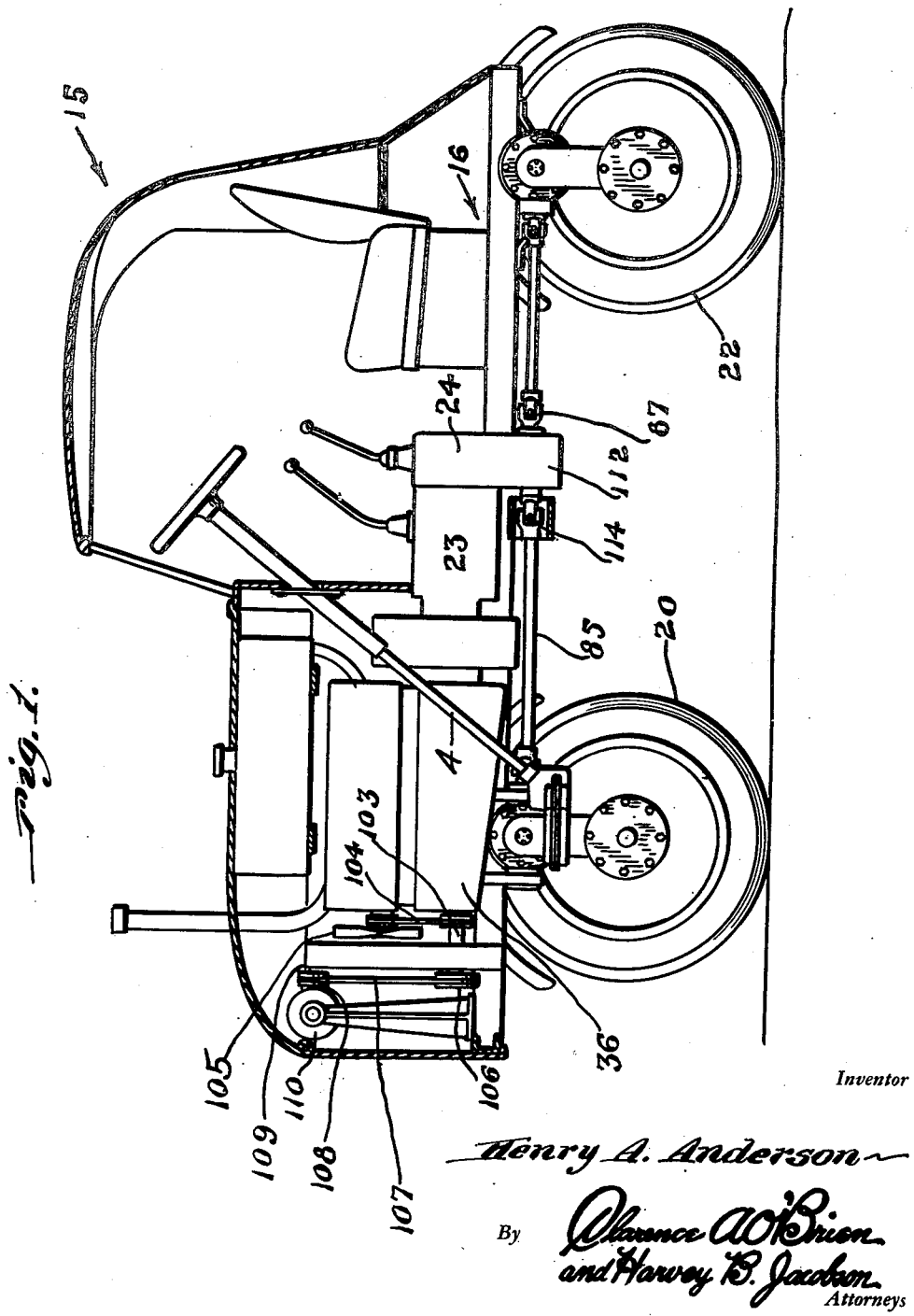

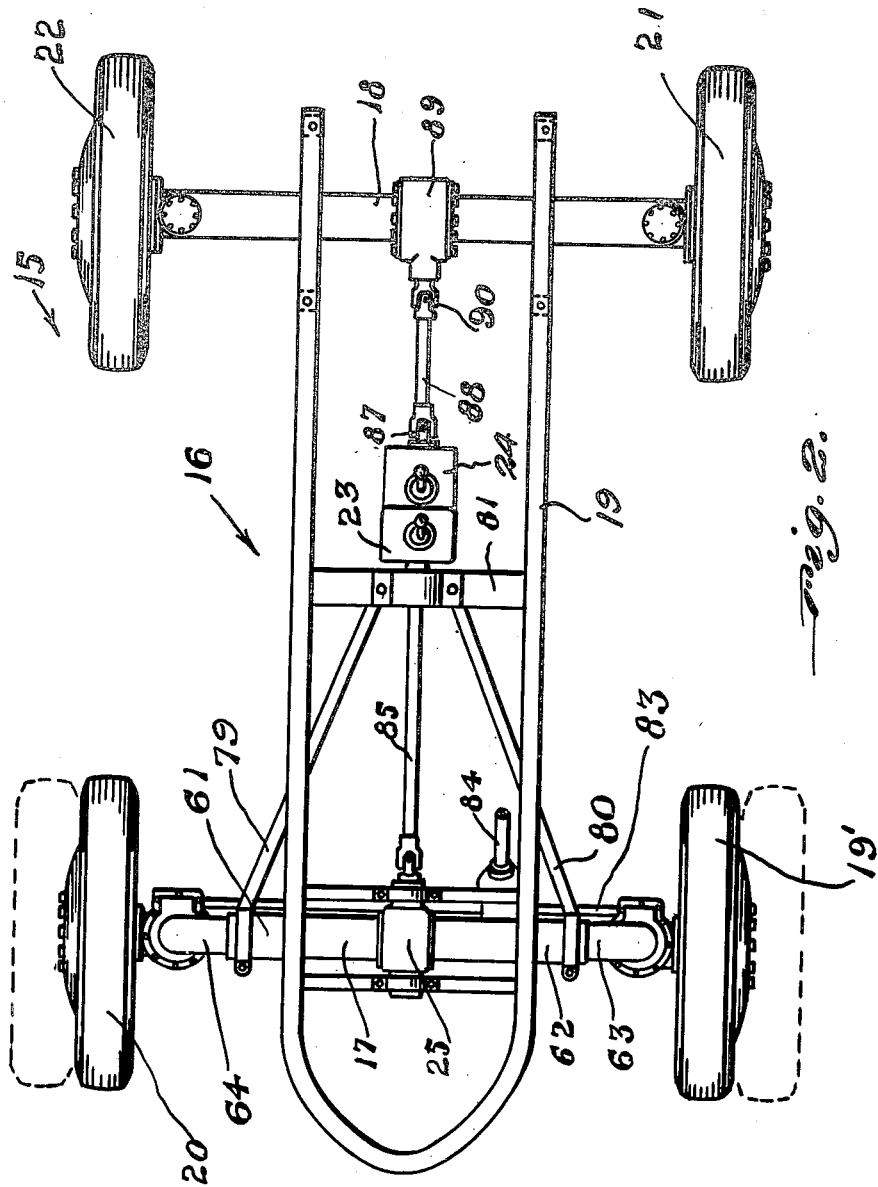

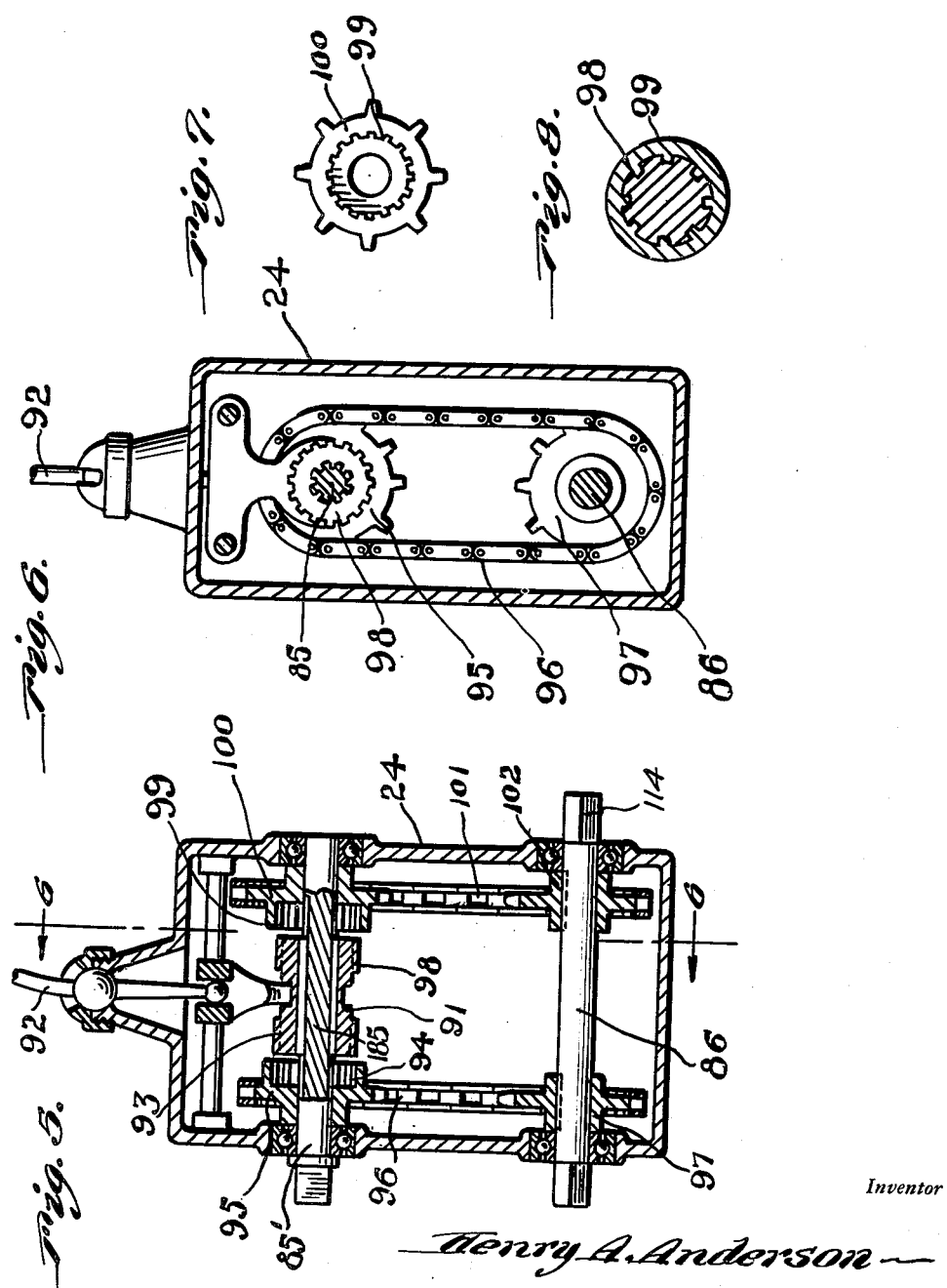

Patented July 15, 1952

2,603,302

UNITED STATES PATENT OFFICE 2,603,302

ADJUSTABLE WIDTH TRACTOR

Henry A. Anderson, Victory, Wis.

Application September 8, 1945, Serial No. 615,109

1 Claim. (Cl. 180—75)

This invention relates to improvements in tractors and has for its object to provide a four-wheel drive farm or other tractor.

Another object of my invention is to provide a tractor in which the front wheels are actuted through their own drive mechanism.

Another object of this invention is to provide a novel driving mechanism for a four-wheel drive tractor.

A further primary object of the invention consists in providing a tractor having a frame the width of the tread of which is adjustable and may be varied in accordance with existing conditions.

A further object of the invention consists in providing a tractor of the above named type in which the load is transmitted from the wheels to the frame by means of a closed substantially tubular system which may be filled with a lubricant and which encloses the driving means which are solely transmitting rotational forces.

Other features and advantages will become more readily apparent from the following description and the accompanying illustrative drawings in which:

Figure 1 is a sectional elevational view of a tractor formed in accordance with my invention, Figure 2 is a plan view of the chassis thereof, Figure 3 is a vertical sectional view of the tractor, illustrating a part of the driving mechanism.

Figure 4 is a broken away portion of a wheel, illustrating a ring gear drive,

Figure 5 is a vertical sectional view of a transmission,

Figure 5 is a sectional view taken on line 6—6 thereof,

Figure 7 is a detail of a transmission gear,

Figure 8 is a transverse sectional view of a slide gear.

In the various views in the drawings as well as in the specification which is now to follow, I use like characters of reference to indicate like parts throughout and in which 15, indicates my tractor which embraces a chassis 16, including the front and rear axle housings 17 and 18, the frame 19, and wheels 19', 20, 21 and 22. Mounted upon the chassis are two separate and independent transmissions 23 and 24, cooperatively hooked up in order to provide a range of six straight ahead speeds and two reverse speeds. The transmission 23, being of the usual three speed forward and one reverse speed type, and is connected to the transmission 24, which is geared for two speeds forward of different range and gears may be so shifted as to provide six speeds forward and two reverse speeds.

The housing 17, includes a gear box 25, within each side of which is mounted raceway bearing plates 26 and 27, in which are roller bearings 28 and 29, for the ends 30 and 31, of a hub member 32, formed of two sections 33 and 34, between which a bevel gear wheel 35, is fixedly secured. This gear 35, is meshed with a gear (not shown) on the shaft of the motor 36. The hub 32, is fixedly secured to a tubular shaft 36a, internally splined as at 37, to receive the spined shafts 38 and 39, both of which are telescopically mounted in the tubular shaft 36, which arrangement permits of adjustment of the gauge of the tractor wheels. A clamp collar 40, or any other adjustable means may be provided on or in connection with each shaft 38 and 39, to hold the same in fixed adjusted position.

On the outer end of each shaft 38 and 39, is fixed a bevel gear 41, meshed with a similar gear 42, on the upper end of one section 43, of a vertical shaft 44, the section 43, being vertically adjustable by means of its splined end 45, operating in an internally splined collar 46, the bolt 47, being adapted to hold the sections 43 and 48, of the shaft in adjusted position. The lower end 49, of shaft 44, carries a bevel gear 50, meshing with a similar gear 53, of larger diameter, and which is fixed on the horizontal tubular shaft 52, internally splined, to receive the splined floating shaft 54, which extends through the hub 55, of one of the wheels as 20. Carried on the outer end 56, of the shaft 54, and the outer end 57, of the hub is the driving gear 58, formed of the spur gear 59, and ring gear 60.

Telescopically mounted in each end 61 and 62, of the housing 17, are extension housings 63 and 64, each terminating outwardly in a right angular depending extension 65. In the outer end 66, of member 64, is a roller bearing 67, for shaft 38, and in the extension 65, are similar bearings 68, 69, 70, 71, 72 and 73, for the respective shafts 44 and 52, and the hub 55. The housing 65, is formed of two connected members 74 and 75. The member 75 terminates in a closed casing, one wall of which is provided with an outwardly projecting tubular cylindrical or conical sleeve which projects towards the wheel 20. The members 74 and 75, may be held adjustably fixed by bolts 76, in order to avoid vertical relative displacements during an inclined position of the tractor. Ends 61 and 62, of housing 17, are held secured in position by brace members 79 and 80, converging inwardly to the transverse frame member 81, of the chassis 16. Bolts 76, operate in horizontal slots 82, in housing member 75, whereby the wheels may be steered through the radius rod 83, and steering post 84. The extension housing 64, the extensions 65 and the hub member 55 form a single closed system which may be filled with a lubricant.

The drive shaft, from the motor 36, connects with the transmission 23, in the usual manner and the transmission 23, is connected to transmission 24, by shaft 85. The shaft 86, of transmission 24, is connected by a universal joint 87, to the shaft 88, connected with the rear wheel drive mechanism 89, through a universal joint 90. The said rear wheel drive mechanism is a duplicate of that of the front wheel drive and adjustment mechanism above detailed and it is thought to be unnecessary to repeat the same herein.

In order to provide a larger speed transmission range I have connected to the usual transmission 23, the auxiliary transmission 24, the shaft 185, of which is connected in any suitable manner (not shown) with drive shaft of transmission 23 (not shown). In the transmission 24, the shaft 185, has slidably splined thereon a double clutch member 91, which is shiftable in the usual manner by the shift rod 92, and the end 93, of the clutch may be engaged with the clutch member 94, having a sprocket wheel 95, fixedly connected thereto. A sprocket chain 96, connects sprocket wheel 95, with a sprocket wheel 97, fixed on shaft 86, whereby said shaft is driven at one speed. Upon shifting clutch end 98, into connection with clutch member 99, fixed to the sprocket wheel 100, which drives sprocket chain 101, with a sprocket wheel 102, fixed on the shaft 86, said shaft is driven at a different speed due to the difference in ratios of the two gears 97 and 102. It is to be understood that the ratio of both of these gears are different to those in the transmission 23, whereby a greater range of speed transmission is provided. The clutch member 91, is of course splined upon shaft 85', to rotate therewith and when shifted to intermediate position relative to clutch members 94 and 99, its action is neutralized and the shaft 86, is not driven as in this position the shaft 86, rotates independently of the sprockets 95 and 100.

The drive shaft 103, for the drive belt 104, of fan 105, is extended to receive the pulley 106, driving a belt 107, in turn driving a pulley 108, on shaft 109, which actuates a winch 110, upon which is wound a lift chain or cable (not shown), by which weights such as log ends, etc. may be raised.

The transmission 23, is mounted above the lower end 112, of transmission 24, in order that shaft 86, and its joints 114 and 87, may align with shafts 85 and 88.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A tractor with a centrally located engine driven front and rear wheel drive shaft, comprising a frame, wheels driven by said shaft, a horizontal supporting member on each side of the tractor, consisting of relatively movable tubular inner and outer telescoping housing sections, the outer housing section being fixedly connected with the frame, a vertical supporting member on each side of the tractor, consisting of tubular sections which include an upper, inner section and an outer, lower section, the upper section of the vertical member being attached to the inner section of the horizontal supporting member, a lower cylindrical supporting casing section attached to the lower and outer section of the tubular vertical supporting member, said casing being provided with a tubular horizontal wheel supporting projection, a tubular hub member on each wheel closed on the outer side coaxial with and surrounding said supporting projection of the casing, the horizontal and the vertical supporting members together with the casing and its projection forming a closed lubricant container and conducting system, a system of drive shaft members coaxial with the tubular supporting members and the cylindrical casing and its projection respectively, said drive shaft system including telescoping splined horizontal drive shaft sections, concentric with the telescoping horizontal supporting members, vertical drive shaft sections concentric with the vertical supporting members and horizontal wheel drive shaft sections, surrounding each other and splined for transmitting rotation, concentric with the cylindrical casing and its tubular projection, roller bearings within each of said supporting members and within said casing for supporting the drive shaft sections concentric with them, roller bearings between the projection of the casing and the surrounding hub member for supporting said wheel rotatably and for transmitting the gravitational load from the supporting member system to the wheel, thus keeping the load from the drive shaft member system, bevel gear wheels for transmitting motion between horizontal and vertical drive shaft sections, means for coupling the horizontal drive shaft section, coaxial with the cylindrical casing and its tubular projection, with the wheel hub member surrounding said tubular projection, and means for driving the outer horizontal drive shaft sections within the horizontal telescoping supporting members, said means including a transmission shaft and an engine driven shaft.

HENRY A. ANDERSON.

REFERENCES CITED

The following references are of record in the file of this patent:

UNITED STATES PATENTS

| Number | Name | Date |
|---|---|---|
| 1,334,475 | Weaver | Mar. 23, 1920 |
| 1,417,950 | Smalley | May 30, 1922 |
| 1,506,653 | Meilike | Aug. 26, 1924 |
| 1,533,531 | White | Apr. 14, 1925 |
| 1,793,482 | Hendrickson | Feb. 24, 1931 |
| 1,840,407 | Norman | Jan. 12, 1932 |
| 1,937,839 | Parrett | Dec. 5, 1933 |
| 1,990,344 | Newhouse | Feb. 5, 1935 |
| 2,132,545 | Smith | Oct. 11, 1938 |
| 2,400,505 | Hedglen | May 21, 1946 |

FOREIGN PATENTS

| Number | Country | Date |
|---|---|---|
| 362,633 | Great Britain | Dec. 10, 1931 |